US010671046B2

(12) United States Patent
Watanabe et al.

(10) Patent No.: US 10,671,046 B2
(45) Date of Patent: Jun. 2, 2020

(54) METHOD AND APPARATUS FOR APPLYING VIBRATION AND MACHINING AN OBJECT

(71) Applicants: Mitsubishi Electric Corporation, Tokyo (JP); CITIZEN WATCH CO., LTD., Nishitokyo-shi, Tokyo (JP); CITIZEN MACHINERY CO., LTD., Nagano (JP)

(72) Inventors: Mitsuo Watanabe, Tokyo (JP); Masakazu Sagasaki, Tokyo (JP); Hitoshi Matsumoto, Nagano (JP); Takanori Shinohara, Nagano (JP); Kazuhiko Sannomiya, Nagano (JP); Yuki Hirata, Aichi (JP)

(73) Assignees: Mitsubishi Electric Corporation, Tokyo (JP); CITIZEN WATCH CO., LTD., Nishitokyo-shi, Tokyo (JP); CITIZEN MACHINERY CO., LTD., Nagano (JP)

( * ) Notice: Subject to any disclaimer, the term of this patent is extended or adjusted under 35 U.S.C. 154(b) by 16 days.

(21) Appl. No.: 15/522,821

(22) PCT Filed: Nov. 26, 2014

(86) PCT No.: PCT/JP2014/081271
§ 371 (c)(1),
(2) Date: Apr. 28, 2017

(87) PCT Pub. No.: WO2016/084171
PCT Pub. Date: Jun. 2, 2016

(65) Prior Publication Data
US 2017/0322538 A1 Nov. 9, 2017

(51) Int. Cl.
G05B 19/402 (2006.01)
G05B 19/4093 (2006.01)
(Continued)

(52) U.S. Cl.
CPC ............. *G05B 19/402* (2013.01); *B23B 1/00* (2013.01); *B23Q 5/50* (2013.01); *B23Q 15/013* (2013.01);
(Continued)

(58) Field of Classification Search
CPC G05B 19/402; G05B 19/404; G05B 19/4093; G05B 2219/37435; B23B 1/00; B23Q 17/12; B23Q 15/013; B23Q 5/50
See application file for complete search history.

(56) References Cited

U.S. PATENT DOCUMENTS 5,778,745 A 7/1998 Furusawa et al.
2003/0065419 A1* 4/2003 Fujishima .......... B23Q 11/0003
700/176

(Continued)

FOREIGN PATENT DOCUMENTS

CN 103785906 A 5/2014
EP 1 762 305 A2 3/2007

(Continued)

OTHER PUBLICATIONS

Notification of Reason for Refusal in corresponding TW 104106209 dated Feb. 18, 2016.

(Continued)

*Primary Examiner* — Nathan L Laughlin
(74) *Attorney, Agent, or Firm* — Sughrue Mion, PLLC; Richard C. Turner

(57) ABSTRACT

A numerical control device is for machining a machining object by moving a tool and the machining object relative to each other along a movement path while applying vibration, by use of a drive axis provided for the tool or the machining object. The device includes a storage unit that holds an invalid frequency region, and a vibration condition determining unit to determine a frequency for the vibration, based (Continued)

on a rotational speed of a main shaft for rotating the machining object, a number of vibrations of the vibration in each one rotation of the main shaft, and the invalid frequency region.

5 Claims, 17 Drawing Sheets

(51) Int. Cl.
    *B23Q 5/50*     (2006.01)
    *B23Q 17/12*     (2006.01)
    *B23B 1/00*     (2006.01)
    *B23Q 15/013*     (2006.01)
    *G05B 19/404*     (2006.01)

(52) U.S. Cl.
    CPC ........... *B23Q 17/12* (2013.01); *G05B 19/404* (2013.01); *G05B 19/4093* (2013.01); *G05B 2219/37077* (2013.01); *G05B 2219/37435* (2013.01)

(56) References Cited

U.S. PATENT DOCUMENTS

| | | | |
|---|---|---|---|
| 2009/0019979 A1 | 1/2009 | Kimura et al. | |
| 2011/0230977 A1 | 9/2011 | Tachibana et al. | |
| 2012/0253708 A1* | 10/2012 | Tanaka | B23Q 11/0039 |
| | | | 702/56 |
| 2013/0309034 A1* | 11/2013 | Inagaki | B23Q 17/0976 |
| | | | 409/132 |
| 2014/0102268 A1 | 4/2014 | Hariki et al. | |
| 2014/0121816 A1 | 5/2014 | Nishimura | |
| 2016/0011579 A1 | 1/2016 | Watanabe et al. | |

FOREIGN PATENT DOCUMENTS

| | | |
|---|---|---|
| JP | 58-143901 A | 8/1983 |
| JP | 10-043901 A | 2/1998 |
| JP | 10-043906 A | 2/1998 |
| JP | 2001-150201 A | 6/2001 |
| JP | 2002-301601 A | 10/2002 |
| JP | 2008-228526 A | 9/2008 |
| JP | 2009-279715 A | 12/2009 |
| JP | 2011-199363 A | 10/2011 |
| JP | 2012-115963 A | 6/2012 |
| JP | 5033929 B1 | 9/2012 |
| JP | 5139591 B1 | 2/2013 |
| JP | 5139592 B1 | 2/2013 |
| JP | 2013-103279 A | 5/2013 |
| JP | 2013-132706 A | 7/2013 |
| JP | 5599523 B1 | 10/2014 |
| TW | 201432402 A | 8/2014 |

OTHER PUBLICATIONS

International Search Report for PCT/JP2014/081271 dated Feb. 17, 2015.

The Extended European Search Report dated Aug. 13, 2018, issued by the European Patent Office in corresponding application No. 14906737.3.

Communication dated Mar. 4, 2019, from the State Intellectual Property Office of People's Republic of China in counterpart Application No. 201480083635.0.

* cited by examiner

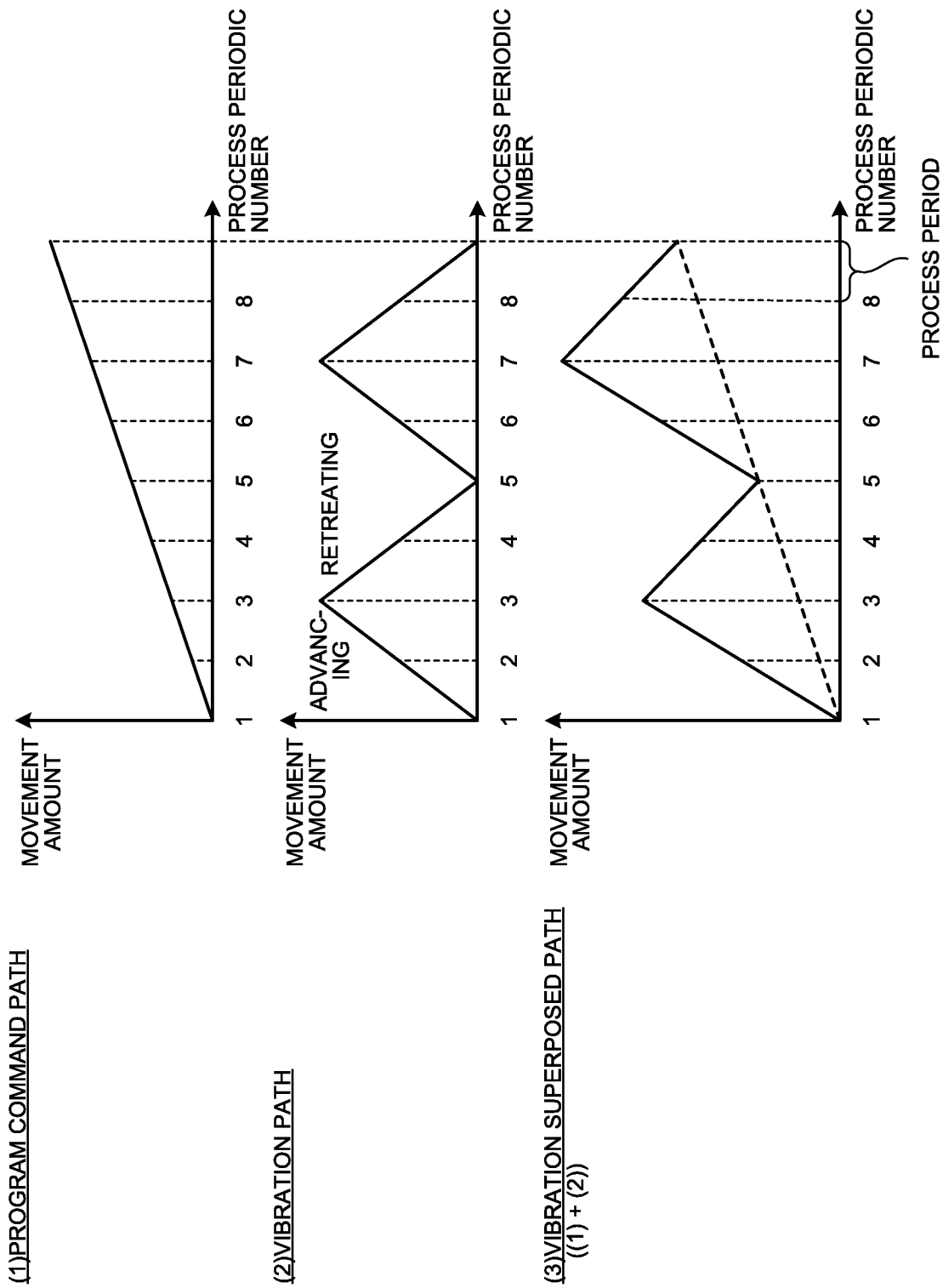

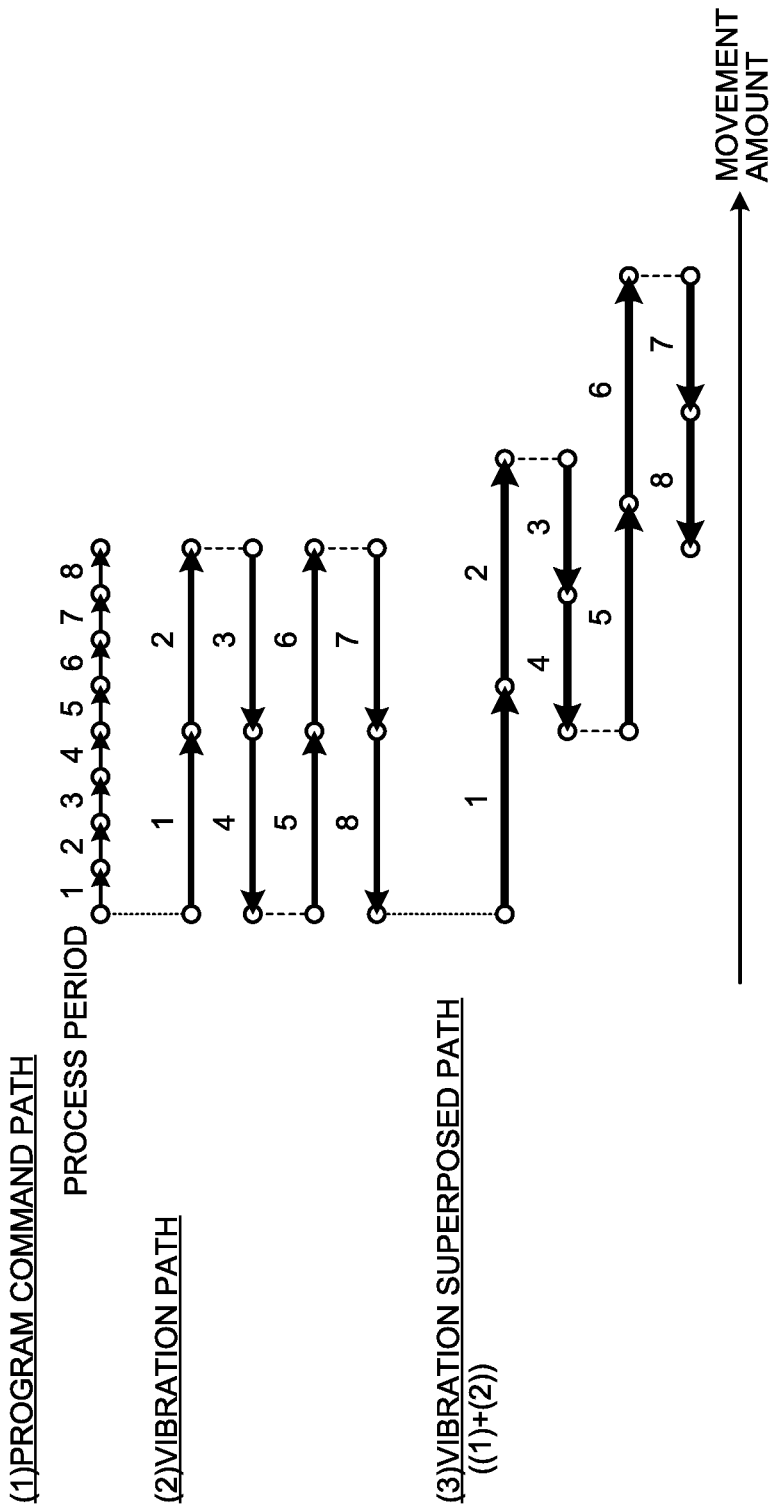

FIG.5

| No. | NECESSARY PROCESS PERIODIC NUMBER PER VIBRATION | NECESSARY TIME (ms) PER VIBRATION | FRE-QUENCY (Hz) | NUMBER OF VIBRATIONS PER ROTATION (times/r) | MAIN SHAFT ROTATIONAL SPEED (r/min) |
|---|---|---|---|---|---|
| 1 | 2 | 2.0 | 500 | 1.5 | 20000 |
| 2 | 3 | 3.0 | 333.3 | 1.5 | 13333 |
| 3 | 4 | 4.0 | 250 | 1.5 | 10000 |
| 4 | 5 | 5.0 | 200 | 1.5 | 8000 |
| 5 | 6 | 6.0 | 166.7 | 1.5 | 6666 |
| 6 | 7 | 7.0 | 142.9 | 1.5 | 5714 |
| 7 | 8 | 8.0 | 125 | 1.5 | 5000 |
| 8 | 9 | 9.0 | 111.1 | 1.5 | 4444 |
| 9 | 10 | 10.0 | 100 | 1.5 | 4000 |
| 10 | 11 | 11.0 | 90.9 | 1.5 | 3636 |
| 11 | 12 | 12.0 | 83.3 | 1.5 | 3333 |
| 12 | 13 | 13.0 | 76.9 | 1.5 | 3076 |
| 13 | 14 | 14.0 | 71.4 | 1.5 | 2857 |
| 14 | 15 | 15.0 | 66.7 | 1.5 | 2666 |
| 15 | 16 | 16.0 | 62.5 | 1.5 | 2500 |
| 16 | 17 | 17.0 | 58.8 | 1.5 | 2352 |
| 17 | 18 | 18.0 | 55.6 | 1.5 | 2222 |
| 18 | 19 | 19.0 | 52.6 | 1.5 | 2105 |
| 19 | 20 | 20.0 | 50 | 1.5 | 2000 |
| ⋮ | ⋮ | ⋮ | ⋮ | ⋮ | ⋮ |

FIG.6

| No. | NECESSARY PROCESS PERIODIC NUMBER PER VIBRATION | NECESSARY TIME (ms) PER VIBRATION | FRE-QUENCY (Hz) | NUMBER OF VIBRATIONS PER ROTATION (times/r) | MAIN SHAFT ROTATIONAL SPEED (r/min) |
|---|---|---|---|---|---|
| 1 | 2 | 2.0 | 500 | 0.5 | 60000 |
| 2 | 3 | 3.0 | 333.3 | 0.5 | 40000 |
| 3 | 4 | 4.0 | 250 | 0.5 | 30000 |
| 4 | 5 | 5.0 | 200 | 0.5 | 24000 |
| 5 | 6 | 6.0 | 166.7 | 0.5 | 20000 |
| 6 | 7 | 7.0 | 142.9 | 0.5 | 17142 |
| 7 | 8 | 8.0 | 125 | 0.5 | 15000 |
| 8 | 9 | 9.0 | 111.1 | 0.5 | 13333 |
| 9 | 10 | 10.0 | 100 | 0.5 | 12000 |
| 10 | 11 | 11.0 | 90.9 | 0.5 | 10909 |
| 11 | 12 | 12.0 | 83.3 | 0.5 | 10000 |
| 12 | 13 | 13.0 | 76.9 | 0.5 | 9230 |
| 13 | 14 | 14.0 | 71.4 | 0.5 | 8571 |
| 14 | 15 | 15.0 | 66.7 | 0.5 | 8000 |
| 15 | 16 | 16.0 | 62.5 | 0.5 | 7500 |
| 16 | 17 | 17.0 | 58.8 | 0.5 | 7058 |
| 17 | 18 | 18.0 | 55.6 | 0.5 | 6666 |
| 18 | 19 | 19.0 | 52.6 | 0.5 | 6315 |
| 19 | 20 | 20.0 | 50 | 0.5 | 6000 |
| ⋮ | ⋮ | ⋮ | ⋮ | ⋮ | ⋮ |

FIG.7

| No. | NECESSARY PROCESS PERIODIC NUMBER PER VIBRATION | NECESSARY TIME (ms) PER VIBRATION | FREQUENCY (Hz) | NUMBER OF VIBRATIONS PER ROTATION (times/r) | MAIN SHAFT ROTATIONAL SPEED (r/min) |
|---|---|---|---|---|---|
| 1 | 2 | 2.0 | 500 | 2.5 | 12000 |
| 2 | 3 | 3.0 | 333.3 | 2.5 | 8000 |
| 3 | 4 | 4.0 | 250 | 2.5 | 6000 |
| 4 | 5 | 5.0 | 200 | 2.5 | 4800 |
| 5 | 6 | 6.0 | 166.7 | 2.5 | 4000 |
| 6 | 7 | 7.0 | 142.9 | 2.5 | 3428 |
| 7 | 8 | 8.0 | 125 | 2.5 | 3000 |
| 8 | 9 | 9.0 | 111.1 | 2.5 | 2666 |
| 9 | 10 | 10.0 | 100 | 2.5 | 2400 |
| 10 | 11 | 11.0 | 90.9 | 2.5 | 2181 |
| 11 | 12 | 12.0 | 83.3 | 2.5 | 2000 |
| 12 | 13 | 13.0 | 76.9 | 2.5 | 1846 |
| 13 | 14 | 14.0 | 71.4 | 2.5 | 1714 |
| 14 | 15 | 15.0 | 66.7 | 2.5 | 1600 |
| 15 | 16 | 16.0 | 62.5 | 2.5 | 1500 |
| 16 | 17 | 17.0 | 58.8 | 2.5 | 1411 |
| 17 | 18 | 18.0 | 55.6 | 2.5 | 1333 |
| 18 | 19 | 19.0 | 52.6 | 2.5 | 1263 |
| 19 | 20 | 20.0 | 50 | 2.5 | 1200 |
| ⋮ | ⋮ | ⋮ | ⋮ | ⋮ | ⋮ |

FIG.8

| No. | NECESSARY PROCESS PERIODIC NUMBER PER VIBRATION | NECESSARY TIME (ms) PER VIBRATION | FRE-QUENCY (Hz) | NUMBER OF VIBRATIONS PER ROTATION (times/r) | MAIN SHAFT ROTATIONAL SPEED (r/min) |
|---|---|---|---|---|---|
| 1 | 30 | 30 | 33.3 | 0.5 | 4000 |
| 2 | 10 | 10 | 100 | 1.5 | 4000 |
| 3 | 6 | 6 | 166.7 | 2.5 | 4000 |
| 4 | 31 | 31 | 32.3 | 0.5 | 3870 |
| 5 | 32 | 32 | 31.3 | 0.5 | 3750 |
| 6 | 33 | 33 | 30.3 | 0.5 | 3636 |
| 7 | 11 | 11 | 90.9 | 1.5 | 3636 |
| 8 | 34 | 34 | 29.4 | 0.5 | 3529 |
| 9 | 35 | 35 | 28.6 | 0.5 | 3428 |
| 10 | 7 | 7 | 142.9 | 2.5 | 3428 |
| 11 | 36 | 36 | 27.8 | 0.5 | 3333 |
| 12 | 12 | 12 | 83.3 | 1.5 | 3333 |
| 13 | 37 | 37 | 27.0 | 0.5 | 3243 |
| 14 | 38 | 38 | 26.3 | 0.5 | 3157 |
| 15 | 39 | 39 | 25.6 | 0.5 | 3076 |
| 16 | 13 | 13 | 76.9 | 1.5 | 3076 |
| 17 | 40 | 40 | 25 | 0.5 | 3000 |
| 18 | 8 | 8 | 125 | 2.5 | 3000 |
| 19 | 41 | 41 | 24.4 | 0.5 | 2926 |
| 20 | 42 | 42 | 23.8 | 0.5 | 2857 |
| 21 | 14 | 14 | 71.4 | 1.5 | 2857 |
| 22 | 43 | 43 | 23.3 | 0.5 | 2790 |
| 23 | 44 | 44 | 22.7 | 0.5 | 2727 |
| 24 | 45 | 45 | 22.2 | 0.5 | 2666 |
| 25 | 15 | 15 | 66.7 | 1.5 | 2666 |
| 26 | 9 | 9 | 111.1 | 2.5 | 2666 |
| 27 | 46 | 46 | 21.7 | 0.5 | 2608 |
| 28 | 47 | 47 | 21.3 | 0.5 | 2553 |
| 29 | 48 | 48 | 20.8 | 0.5 | 2500 |
| 30 | 16 | 16 | 62.5 | 1.5 | 2500 |
| 31 | 49 | 49 | 20.4 | 0.5 | 2448 |
| 32 | 50 | 50 | 20 | 0.5 | 2400 |
| 33 | 10 | 10 | 100 | 2.5 | 2400 |

FIG.10

| PARAMETER | SET VALUE |
|---|---|
| MINIMUM VALUE OF INVALID FREQUENCY REGION | 70 |
| MAXIMUM VALUE OF INVALID FREQUENCY REGION | 90 |

FIG.11

| No. | NECESSARY PROCESS PERIODIC NUMBER PER VIBRATION | NECESSARY TIME (ms) PER VIBRATION | FRE-QUENCY (Hz) | NUMBER OF VIBRATIONS PER ROTATION (times/r) | MAIN SHAFT ROTATIONAL SPEED (r/min) |
|---|---|---|---|---|---|
| 1 | 2 | 2.0 | 500 | 1.5 | 20000 |
| 2 | 3 | 3.0 | 333.3 | 1.5 | 13333 |
| 3 | 4 | 4.0 | 250 | 1.5 | 10000 |
| 4 | 5 | 5.0 | 200 | 1.5 | 8000 |
| 5 | 6 | 6.0 | 166.7 | 1.5 | 6666 |
| 6 | 7 | 7.0 | 142.9 | 1.5 | 5714 |
| 7 | 8 | 8.0 | 125 | 1.5 | 5000 |
| 8 | 9 | 9.0 | 111.1 | 1.5 | 4444 |
| 9 | 10 | 10.0 | 100 | 1.5 | 4000 |
| 10 | 11 | 11.0 | 90.9 | 1.5 | 3636 |
| 11 | 12 | 12.0 | 83.3 | 1.5 | 3333 |
| 12 | 13 | 13.0 | 76.9 | 1.5 | 3076 |
| 13 | 14 | 14.0 | 71.4 | 1.5 | 2857 |
| 14 | 15 | 15.0 | 66.7 | 1.5 | 2666 |
| 15 | 16 | 16.0 | 62.5 | 1.5 | 2500 |
| 16 | 17 | 17.0 | 58.8 | 1.5 | 2352 |
| 17 | 18 | 18.0 | 55.6 | 1.5 | 2222 |
| 18 | 19 | 19.0 | 52.6 | 1.5 | 2105 |
| 19 | 20 | 20.0 | 50 | 1.5 | 2000 |
| ⋮ | ⋮ | ⋮ | ⋮ | ⋮ | ⋮ |

FIG.13

| PARAMETER | X-AXIS SET VALUE | Z-AXIS SET VALUE |
|---|---|---|
| MINIMUM VALUE OF INVALID FREQUENCY REGION 1 | 50 | 75 |
| MAXIMUM VALUE OF INVALID FREQUENCY REGION 1 | 55 | 90 |
| MINIMUM VALUE OF INVALID FREQUENCY REGION 2 | 70 | 0 |
| MAXIMUM VALUE OF INVALID FREQUENCY REGION 2 | 80 | 0 |
| MINIMUM VALUE OF INVALID FREQUENCY REGION 3 | 100 | 0 |
| MAXIMUM VALUE OF INVALID FREQUENCY REGION 3 | 125 | 0 |

FIG.15

| No. | NECESSARY PROCESS PERIODIC NUMBER PER VIBRATION | NECESSARY TIME (ms) PER VIBRATION | FRE-QUENCY (Hz) | NUMBER OF VIBRATIONS PER ROTATION (times/r) | MAIN SHAFT ROTATIONAL SPEED (r/min) |
|---|---|---|---|---|---|
| 1 | 2 | 2.0 | 500 | 1.5 | 20000 |
| 2 | 3 | 3.0 | 333.3 | 1.5 | 13333 |
| 3 | 4 | 4.0 | 250 | 1.5 | 10000 |
| 4 | 5 | 5.0 | 200 | 1.5 | 8000 |
| 5 | 6 | 6.0 | 166.7 | 1.5 | 6666 |
| 6 | 7 | 7.0 | 142.9 | 1.5 | 5714 |
| 7 | 8 | 8.0 | 125 | 1.5 | 5000 |
| 8 | 9 | 9.0 | 111.1 | 1.5 | 4444 |
| 9 | 10 | 10.0 | 100 | 1.5 | 4000 |
| 10 | 11 | 11.0 | 90.9 | 1.5 | 3636 |
| 11 | 12 | 12.0 | 83.3 | 1.5 | 3333 |
| 12 | 13 | 13.0 | 76.9 | 1.5 | 3076 |
| 13 | 14 | 14.0 | 71.4 | 1.5 | 2857 |
| 14 | 15 | 15.0 | 66.7 | 1.5 | 2666 |
| 15 | 16 | 16.0 | 62.5 | 1.5 | 2500 |
| 16 | 17 | 17.0 | 58.8 | 1.5 | 2352 |
| 17 | 18 | 18.0 | 55.6 | 1.5 | 2222 |
| 18 | 19 | 19.0 | 52.6 | 1.5 | 2105 |
| 19 | 20 | 20.0 | 50 | 1.5 | 2000 |
| ⋮ | ⋮ | ⋮ | ⋮ | ⋮ | ⋮ |

FIG.16

| No. | NECESSARY PROCESS PERIODIC NUMBER PER VIBRATION | NECESSARY TIME (ms) PER VIBRATION | FREQUENCY (Hz) | NUMBER OF VIBRATIONS PER ROTATION (times/r) | MAIN SHAFT ROTATIONAL SPEED (r/min) |
|---|---|---|---|---|---|
| 1 | 30 | 30 | 33.3 | 0.5 | 4000 |
| 2 | 10 | 10 | 100 | 1.5 | 4000 |
| 3 | 6 | 6 | 166.7 | 2.5 | 4000 |
| 4 | 31 | 31 | 32.3 | 0.5 | 3870 |
| 5 | 32 | 32 | 31.3 | 0.5 | 3750 |
| 6 | 33 | 33 | 30.3 | 0.5 | 3636 |
| 7 | 11 | 11 | 90.9 | 1.5 | 3636 |
| 8 | 34 | 34 | 29.4 | 0.5 | 3529 |
| 9 | 35 | 35 | 28.6 | 0.5 | 3428 |
| 10 | 7 | 7 | 142.9 | 2.5 | 3428 |
| 11 | 36 | 36 | 27.8 | 0.5 | 3333 |
| 12 | 12 | 12 | 83.3 | 1.5 | 3333 |
| 13 | 37 | 37 | 27.0 | 0.5 | 3243 |
| 14 | 38 | 38 | 26.3 | 0.5 | 3157 |
| 15 | 39 | 39 | 25.6 | 0.5 | 3076 |
| 16 | 13 | 13 | 76.9 | 1.5 | 3076 |
| 17 | 40 | 40 | 25 | 0.5 | 3000 |
| 18 | 8 | 8 | 125 | 2.5 | 3000 |
| 19 | 41 | 41 | 24.4 | 0.5 | 2926 |
| 20 | 42 | 42 | 23.8 | 0.5 | 2857 |
| 21 | 14 | 14 | 71.4 | 1.5 | 2857 |
| 22 | 43 | 43 | 23.3 | 0.5 | 2790 |
| 23 | 44 | 44 | 22.7 | 0.5 | 2727 |
| 24 | 45 | 45 | 22.2 | 0.5 | 2666 |
| 25 | 15 | 15 | 66.7 | 1.5 | 2666 |
| 26 | 9 | 9 | 111.1 | 2.5 | 2666 |
| 27 | 46 | 46 | 21.7 | 0.5 | 2608 |
| 28 | 47 | 47 | 21.3 | 0.5 | 2553 |
| 29 | 48 | 48 | 20.8 | 0.5 | 2500 |
| 30 | 16 | 16 | 62.5 | 1.5 | 2500 |
| 31 | 49 | 49 | 20.4 | 0.5 | 2448 |
| 32 | 50 | 50 | 20 | 0.5 | 2400 |
| 33 | 10 | 10 | 100 | 2.5 | 2400 |

METHOD AND APPARATUS FOR APPLYING VIBRATION AND MACHINING AN OBJECT

CROSS REFERENCE TO RELATED APPLICATIONS

This application is a National Stage of International Application No. PCT/JP2014/081271 filed Nov. 26, 2014, the contents of all of which are incorporated herein by reference in their entirety.

FIELD

The present invention relates to a numerical control device for controlling the relative movement between a workpiece and a tool for machining the workpiece.

BACKGROUND

Conventionally, in relation to turning, there is proposed a numerical control device that includes a cutting tool feeding mechanism for causing a cutting tool to perform a feeding operation with respect to a workpiece, and a control mechanism for controlling a cutting tool feed-drive motor while applying low frequency vibration to the cutting tool (see Patent Literatures 1 to 3). In this numerical control device, the control mechanism includes: an operation unit for performing various kinds of setting; a vibration cutting information storing unit that stores a table prepared in advance at least about the advancing amount, retreating amount, advancing speed, and retreating speed of the cutting tool feeding mechanism, in accordance with a mechanical characteristic, such as a feeding axis inertia or a motor characteristic, where the table is stored as data that enables the cutting tool to operate at a low frequency of 25 Hz or more to perform a feeding operation in a synchronizing state, in accordance with a revolution number of the workpiece or a feeding amount of the cutting tool per rotation of the cutting tool, which has been set by the operation unit; and a motor control unit for controlling the cutting tool feed-drive motor, based on the data stored in the vibration cutting information storing unit. With this arrangement, the low frequency vibration is generated by repeating the advancing and retreating operations along an interpolation path.

CITATION LIST

Patent Literature

Patent Literature 1: Japanese Patent No. 5033929
Patent Literature 2: Japanese Patent No. 5139591
Patent Literature 3: Japanese Patent No. 5139592

SUMMARY

Technical Problem

Patent Literatures 1 to 3 listed above disclose a method of driving the motor by use of a movement command generated by superposing vibration in the movement direction onto a movement command specified from a program. However, if the low frequency vibration given to the movement command specified from a program has a frequency that causes mechanical resonance, the machine may start oscillation. Accordingly, it is necessary to avoid superposing low frequency vibration falling in a frequency band that causes mechanical resonance.

The present invention has been made in view of the above, and an object of the present invention is to provide a numerical control device that can automatically select vibration conditions optimum to low frequency vibration cutting.

Solution to Problem

To solve the above problems and achieve the object, a numerical control device for machining a machining object by moving a tool and the machining object relative to each other along a movement path while applying vibration, by use of drive axes provided for the tool or the machining object, according to the present invention includes: a storage unit that holds an invalid frequency region; and a vibration condition determining unit to determine a frequency for the vibration, based on a rotational speed of a main shaft for rotating the machining object, a number of vibrations of the vibration in each one rotation of the main shaft, and the invalid frequency region.

Advantageous Effects of Invention

The numerical control device according to the present invention has an effect capable of automatically selecting vibration conditions optimum to low frequency vibration cutting.

BRIEF DESCRIPTION OF DRAWINGS

FIGS. 2(a) and 2(b) include views each schematically illustrating a configuration of axes in the numerical control device according to the basic form, in which FIG. 2(a) is a view of a case where only a tool is moved in Z-axis and X-axis directions, and FIG. 2(b) is a view of a case where a machining object is moved in the Z-axis direction, and a tool is moved in the X-axis direction.

FIG. 3 is a view for explaining changes in movement amount depending on the process periodic number, in a vibration superposed path according to the basic form.

FIG. 4 is a view schematically illustrating changes in movement amount in units of the process period, where the movement amounts indicated on the vertical axes of FIG. 3 are aligned in the horizontal axis direction.

FIG. 5 is a view illustrating an example of vibration conditions, under the number of vibrations per rotation=1.5 (times/r), according to the basic form.

FIG. 6 is a view illustrating an example of vibration conditions, under the number of vibrations per rotation=0.5 (times/r), according to the basic form.

FIG. 7 is a view illustrating an example of vibration conditions, under the number of vibrations per rotation=2.5 (times/r), according to the basic form.

FIG. 8 is a view illustrating an example of vibration conditions, under the number of vibrations per rotation=0.5, 1.5, and 2.5 (times/r), according to the basic form.

FIG. 10 is a view illustrating a concrete example of an invalid frequency region according to the first embodiment.

FIG. 11 is a view illustrating an invalid frequency region according to the first embodiment, by giving hatching to the example of FIG. 5.

FIG. 13 is a view illustrating a concrete example of invalid frequency regions for respective axes, according to the second embodiment.

FIG. 15 is a view illustrating an invalid frequency region according to the second embodiment, by giving hatching to the example of FIG. 5.

FIG. 16 is a view illustrating an invalid frequency region according to the second embodiment, by giving hatching to the example of FIG. 8.

DESCRIPTION OF EMBODIMENTS

Exemplary embodiments of a numerical control device according to the present invention will be explained below in detail with reference to the accompanying drawings. The present invention is not limited to the following embodiments.

Figure 1:
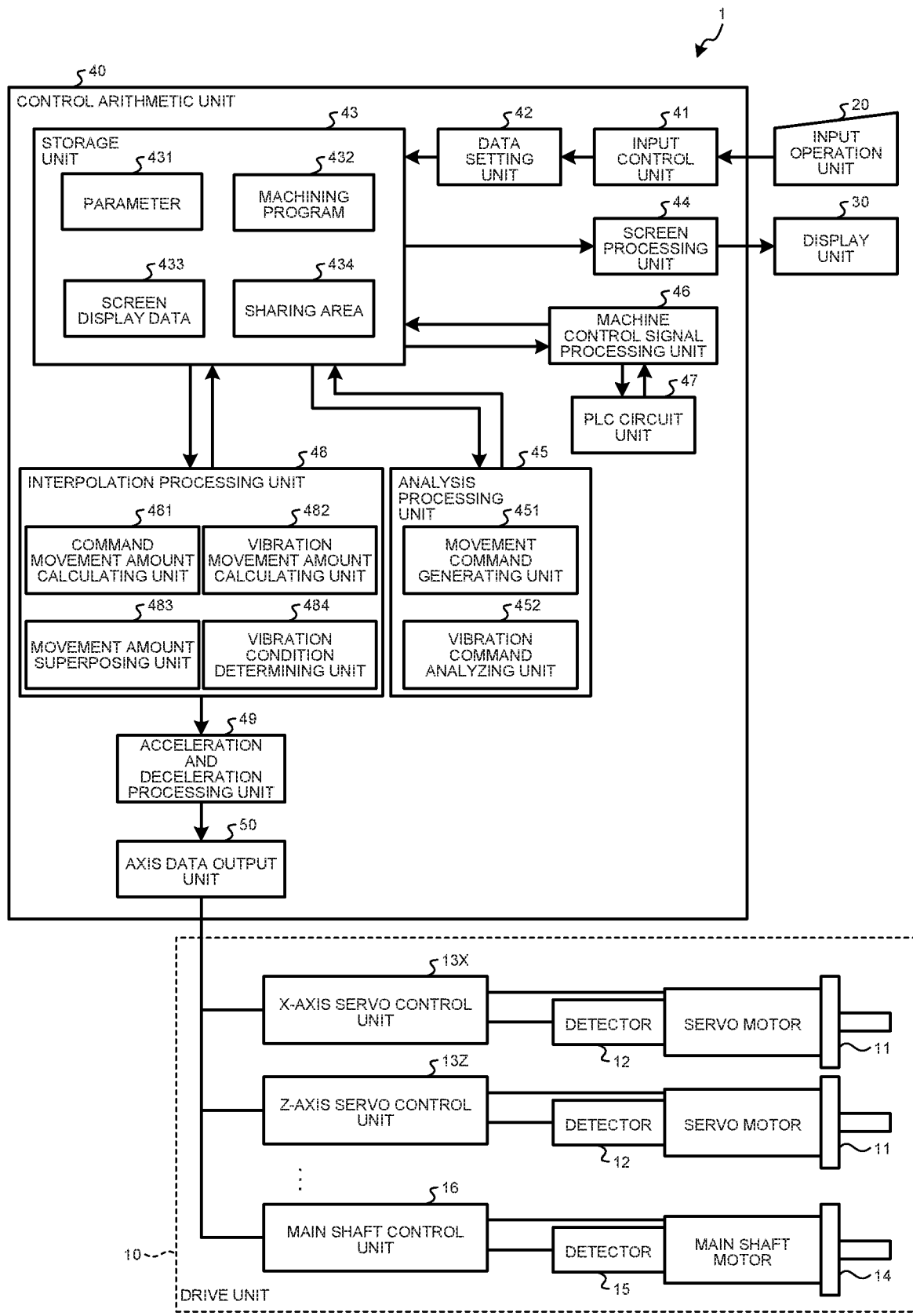
FIG. 1 is a block diagram illustrating a configuration example of a numerical control device according to a basic form.

Prior to explanations of embodiments of the present invention, an explanation will be given of a basic form serving as a premise technology relating to the present invention. FIG. 1 is a block diagram illustrating a configuration example of a numerical control device 1 according to the basic form relating to the present invention. The numerical control device 1 includes a drive unit 10, an input operation unit 20, a display unit 30, and control arithmetic unit 40.

The drive unit 10 is a mechanism for driving either one of or both of a machining object and a tool in at least two axis directions. The drive unit 10 includes: servo motors 11 for moving the machining object or tool in respective axis directions defined on the numerical control device 1; detectors 12 for detecting the position and speed of the respective servo motors 11; and an X-axis servo control unit 13X and a Z-axis servo control unit 13Z for controlling the position and speed of the machining object or tool in the respective axis directions, based on the position and speed detected by the detectors 12. The numerical control device 1 according to the basic form uses these drive axes provided for the tool or machining object to move the tool and the machining object relative to each other along the movement path while applying vibration between them, and thereby to perform machining of the machining object.

Further, the drive unit 10 includes: a main shaft motor 14 for rotating a main shaft that holds the machining object; a detector 15 for detecting the position and revolution number of the main shaft motor 14; and a main shaft control unit 16 for controlling the rotation of the main shaft, based on the position and revolution number detected by the detector 15.

The input operation unit 20 is formed of an input unit, such as a keyboard, buttons, or a mouse, and is used by a user to input a command for the numerical control device 1 or to input a machining program or parameter. The display unit 30 is formed of a display unit, such as a liquid crystal display device, and is used to display information processed by the control arithmetic unit 40.

The control arithmetic unit 40 includes an input control unit 41, a data setting unit 42, a storage unit 43, a screen processing unit 44, an analysis processing unit 45, a machine control signal processing unit 46, a PLC (Programmable Logic Controller) circuit unit 47, an interpolation processing unit 48, an acceleration and deceleration processing unit 49, and an axis data output part 50.

The input control unit 41 receives information input from the input operation unit 20. The data setting unit 42 causes the storage unit 43 to store the information received by the input control unit 41. For example, when the input content is editing of a machining program 432, the input control unit 41 reflects the editing content onto the machining program 432 stored in the storage unit 43. When a parameter is input, the input control unit 41 causes a storage region of a parameter 431 of the storage unit 43 to store the parameter.

The storage unit 43 stores information, such as the parameter 431 to be used for processing of the control arithmetic unit 40, a machining program 432 to be executed, and screen display data 433 to be displayed on the display unit 30. Further, the storage unit 43 includes a sharing area 434 to store data temporarily used other than the parameter 431 and the machining program 432. The screen processing unit 44 performs control to display the screen display data 433 of the storage unit 43 on the display unit 30.

The analysis processing unit 45 includes: a movement command generating unit 451 for generating a movement command of instructing a movement on a movement path at each block, by reading the machining program 432 including one or more blocks and analyzing the read machining program for each block; and a vibration command analyzing unit 452 for analyzing the machining program 432 as to whether a vibration command for vibration cutting machining is included therein, and generating vibration conditions to be contained in the vibration command if the vibration command is included. The vibration conditions generated by the vibration command analyzing unit 452 include amplitude.

When the analysis processing unit 45 reads an auxiliary command that is a command for operating the machine other than the command for operating the drive axes serving as numerical control axes, the machine control signal processing unit 46 gives notice of issuance of the auxiliary command to the PLC circuit unit 47. Upon receiving the notice of issuance of the auxiliary command issued from the machine control signal processing unit 46, the PLC circuit unit 47 performs a process corresponding to the issued auxiliary command.

The interpolation processing unit 48 includes: a command movement amount calculating unit 481 for calculating a command movement amount that is a movement amount of a movement to be made during a process period used as a control period of the numerical control device 1, by use of a movement command analyzed by the analysis processing unit 45; a vibration movement amount calculating unit 482 for calculating a vibration movement amount that is a movement amount to be made during the process period for vibrating the tool or machining object based on the vibration conditions; a movement amount superposing unit 483 for calculating a superposed movement amount by superposing the vibration movement amount onto the command movement amount per process period; and a vibration condition determining unit 484 for determining a vibration frequency that is one of the vibration conditions. The vibration movement amount calculating unit 482 calculates the vibration movement amount, based on the vibration conditions generated by the vibration command analyzing unit 452 and the vibration condition determining unit 484. Here, the process period may also be referred to as "interpolation period".

The acceleration and deceleration processing unit 49 transforms the superposed movement amount for each drive axis, which has been output from the interpolation processing unit 48, into a command about a movement per process period in consideration of acceleration and deceleration, in accordance with acceleration and deceleration patterns specified in advance. The axis data output unit 50 outputs the command about a movement per process period processed by the acceleration and deceleration processing unit 49 to each of the X-axis servo control unit 13X, the Z-axis servo control unit 13Z, and the main shaft control unit 16 for controlling the respective drive axes.

Figure 2A:
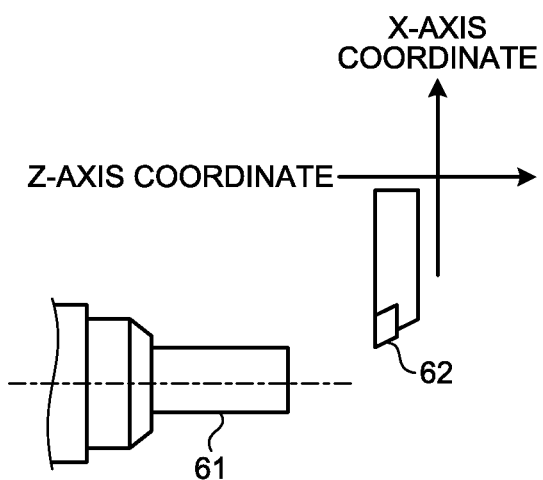
Figure 2B:
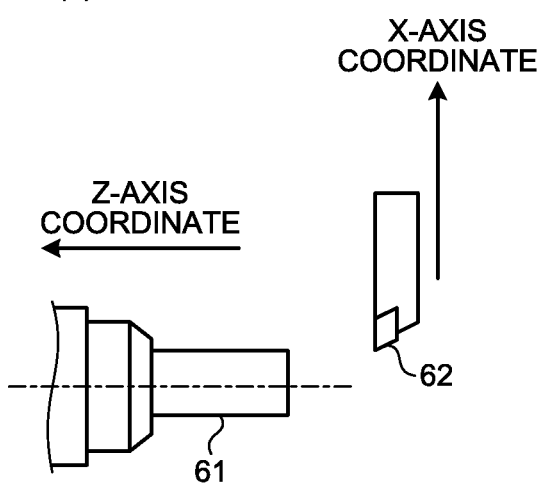

In order to perform machining while vibrating the tool or machining object, a relative movement may be given between the machining object and the tool during the machining, as described above. FIG. 2 is a drawing that schematically illustrates a configuration of axes in the numerical control device 1 according to the basic form for performing turning. As illustrated in FIG. 2, a Z-axis and an X-axis are provided to orthogonally cross each other in the paper. FIG. 2(*a*) is a view of a case where a machining object 61 is fixed and only a tool 62, which is a turning tool for performing turning, is moved in the Z-axis direction and in the X-axis direction. Further, FIG. 2(*b*) is a view of a case where a machining object 61 is moved in the Z-axis direction, and a tool 62 is moved in the X-axis direction. In either one of these cases, if either one of or both of the machining object 61 and the tool 62 to be moved are provided with either one of or both of the servo motor 11 and the main shaft motor 14, a process described below can be performed.

FIG. 3 is a drawing for explaining changes in movement amount depending on the process periodic numbers, in a vibration superposed path. In FIG. 3, the horizontal axis indicates the process periodic number, and the vertical axes respectively indicate the movement amounts in (1) "program command path", (2) "vibration path", and (3) "vibration superposed path", in a separated state. The (3) "vibration superposed path" is formed by superposing the (1) "program command path" and the (2) "vibration path" onto each other. The movement amount in the (1) "program command path" is calculated by the command movement amount calculating unit 481. The movement amount in the (2) "vibration path" is calculated by the vibration movement amount calculating unit 482. The movement amount in the (3) "vibration superposed path" is calculated by the movement amount superposing unit 483. FIG. 4 is a view schematically illustrating changes in movement amount in units of the process period, where the movement amounts indicated on the vertical axes of the (1) "program command path", the (2) "vibration path", and the (3) "vibration superposed path" in FIG. 3 are aligned in the horizontal axis direction.

As illustrated in FIG. 3, the interpolation processing unit 48 creates a composite movement command by superposing a vibration movement command onto a movement command for every process period. In the example of the (2) "vibration path" illustrated in FIG. 3, since two process periods are used for each of the advancing and retreating of the vibration for vibration cutting, four process periods are required for one period of the vibration. In consideration of the fact that each of the advancing and retreating of the vibration for vibration cutting needs at least one process period, the minimum value of one period of the vibration for vibration cutting is two process periods. Here, the times respectively used for the advancing and retreating of the vibration for vibration cutting do not necessarily have to be the same time. If the advancing uses two process periods and the retreating uses one process period, one period of the vibration becomes three process periods. Accordingly, one period of the vibration may become an odd-number times the process period.

FIG. 5 is a view illustrating an example of vibration conditions, which can be taken when the above-described process period inside the numerical control device 1 is 1.0 (ms). FIG. 5 illustrates the necessary process periodic number per vibration for vibration cutting, the necessary time (ms) per vibration, the vibration frequency (Hz), the number of vibrations per rotation (times/r) that means the number of vibrations in each one rotation of the main shaft, and the main shaft rotational speed (r/min), while increasing the necessary process periodic number per one vibration one by one from the above-described minimum value of 2. The unit (r/min) of the main shaft rotational speed denotes the number of revolutions (r) of the main shaft per minute. All of the conditions illustrated in FIG. 5 correspond to a case where the number of vibrations per rotation, which means the number of vibrations in each one rotation of the main shaft, is 1.5 (times/r).

When the process period is sufficiently short, the vibration frequency is determined substantially from the main shaft rotational speed and the number of vibrations per rotation that means the number of vibrations in each one rotation of the main shaft. For example, where the number of vibrations per rotation=1.5 (times/r) and the main shaft rotational speed=4,000 (r/min) are given as vibration cutting conditions as illustrated in the case No. 9 of FIG. 5, the vibration condition determining unit 484 determines the vibration frequency to be 100 (Hz) by the following calculation.

$$4{,}000 \text{ (r/min)} \times 1.5 \text{ (times/r)}/60 \text{ (s)} = 100 \text{ (Hz)}$$

Here, the main shaft rotational speed is described in the machining program 432 in general, and the analysis processing unit 45 reads it and writes it into the sharing area 434. The vibration condition determining unit 484 reads the main shaft rotational speed from the sharing area 434. Further, the number of vibrations per rotation is held in the parameter 431 of the storage unit 43 in general, but it may be described in the machining program 432 and to be read by the vibration condition determining unit 484 via the sharing area 434, same as the main shaft rotational speed.

As described above, when the process period is sufficiently small and thus does not need to be considered, the vibration condition determining unit 484 can uniquely determine the vibration frequency for vibration cutting from arbitrarily given values of the main shaft rotational speed (r/min) and the number of vibrations per rotation (times/r).

In practice, as illustrated in FIG. 5, where the process period inside the numerical control device 1 is not sufficiently small, the vibration frequency can take only a discrete value because of the circumstance that the necessary process periodic number per vibration can take only a value of an integral multiple of two times or more of the process period. Accordingly, even if a value of the main shaft rotational speed (r/min) is given in a situation predetermined that the number of vibrations per rotation=1.5 (times/r) as illustrated in FIG. 5, the vibration condition determining unit 484 needs to keep the binding condition that the necessary process periodic number per vibration can take only a value of an integral multiple of two times or more of the process period. Thus, the vibration condition determining unit 484 has to select a value of the main shaft rotational speed (r/min) in FIG. 5, which is closest to the given value of the main shaft rotational speed (r/min).

For example, under the number of vibrations per rotation=1.5 (times/r), when the machining program 432 commands the main shaft rotational speed=3,000 (r/min), the vibration condition determining unit 484 automatically selects a frequency of 76.9 (Hz) in the conditions of No. 12, which include the main shaft rotational speed=3,076 (r/min) that is closest to the main shaft rotational speed=3,000 (r/min), to perform vibration cutting. In this case, the vibration condition determining unit 484 automatically changes the main shaft rotational speed in accordance the number of vibrations per rotation, but a value of the main shaft rotational speed commanded by the machining program 432 may be used to perform the operation, if a disagreement occurring in the number of vibrations per rotation is acceptable. In other word, in order to keep the main shaft rotational speed=3,000 (r/min), the number of vibrations per rotation (times/r) may be set to a value deviating from 1.5 to some extent. In any case, such a condition is kept that the necessary process periodic number per one vibration for vibration cutting can take only a value of an integral multiple of two times or more of the process period.

In the above description, an explanation has been given under the number of vibrations per rotation=1.5 (times/r). FIG. 6 is a view illustrating vibration conditions, under the number of vibrations per rotation=0.5 (times/r). FIG. 7 is a view illustrating vibration conditions, under the number of vibrations per rotation=2.5 (times/r). Accordingly, in the example illustrated in FIG. 6, under the number of vibrations per rotation=0.5 (times/r), the vibration frequency can take only a discrete value, as in the case described above. In the example illustrated in FIG. 7, under the number of vibrations per rotation=2.5 (times/r), the vibration frequency can take only a discrete value, as in the case described above.

Further, FIG. 8 is a view illustrating vibration conditions in a situation where three values of 0.5, 1.5, and 2.5 are acceptable as the number of vibrations per rotation (times/r), by sorting them in the order of values of the main shaft rotational speed, under the main shaft rotational speed=4,000 (r/min) or less. In the situation illustrated in FIG. 8 where three values of 0.5, 1.5, and 2.5 are acceptable as the number of vibrations per rotation (times/r), when the machining program 432 commands the main shaft rotational speed=3,000 (r/min), the vibration conditions to be selected from FIG. 8 are those of either one of No. 17 and No. 18 including a condition closest to 3,000 (r/min). In order to select either one of them, for example, there may be predetermined a rule "to select one with a larger value of the number of vibrations per rotation".

When the machining program 432 instructs a value of the main shaft rotational speed other than the values of the main shaft rotational speed listed in FIG. 8, the value of the main shaft rotational speed (r/min) to be selected is one closest to the instructed value of the main shaft rotational speed. Alternatively, in order to keep the instructed value of the main shaft rotational speed, the number of vibrations per rotation (times/r) may be set to a value deviating from the three values of 0.5, 1.5, and 2.5 to some extent. As described above, the numerical control device 1 can set an appropriate frequency for low frequency vibration cutting.

First Embodiment

Figure 9:
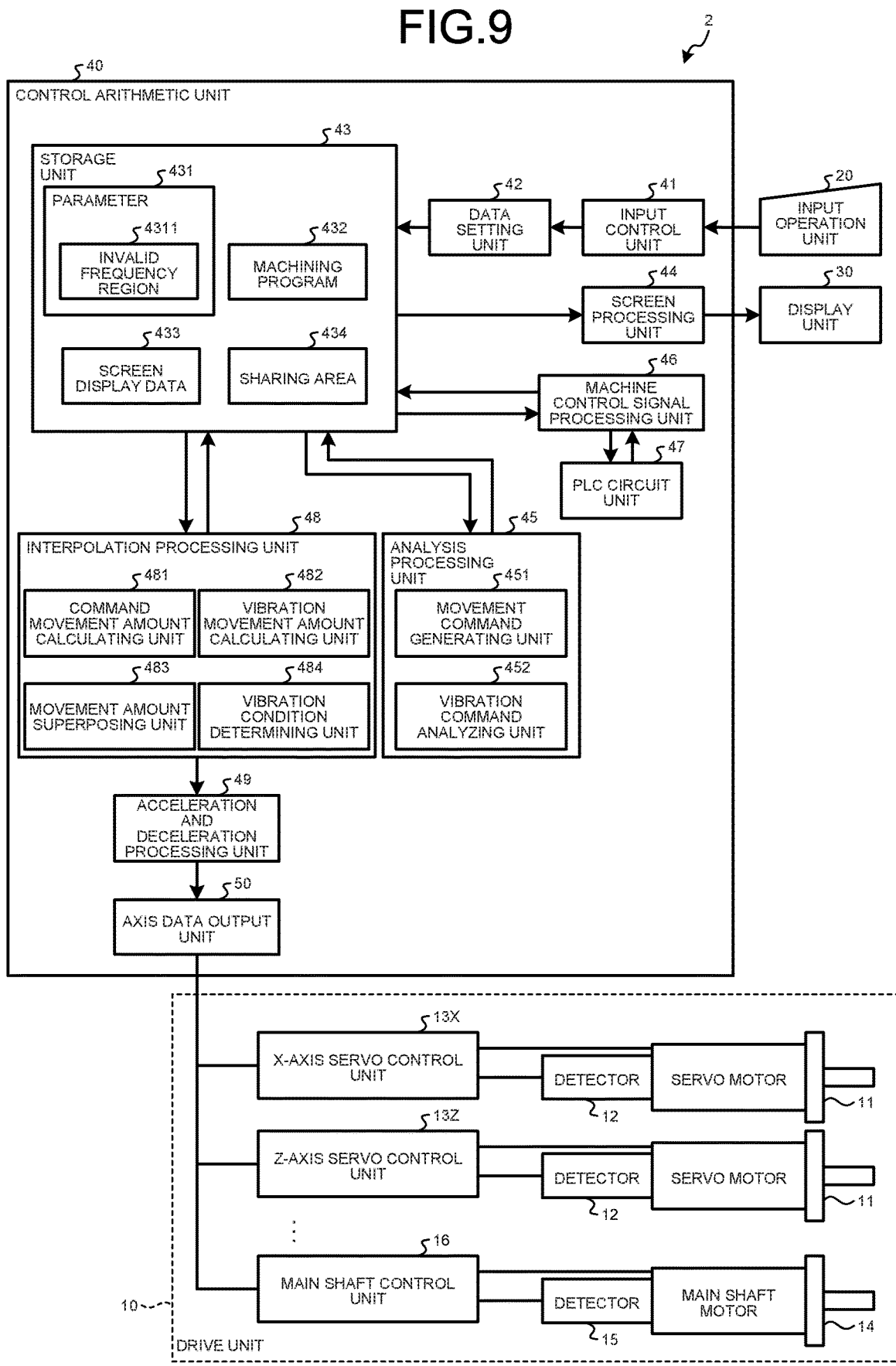
FIG. 9 is a block diagram illustrating a configuration example of a numerical control device according to a first embodiment.

FIG. 9 is a block diagram illustrating a configuration example of a numerical control device 2 according to a first embodiment. The numerical control device 2 includes an invalid frequency region 4311 indicating a region of a frequency that cannot be set as the vibration frequency by the parameter 431 of the storage unit 43. Other than the above, the components of the block denoted by the same reference symbols as those of FIG. 1 have the same functions as those described above, and so their description will be omitted.

Where a frequency commanded by the numerical control device as the vibration frequency for low frequency vibration cutting is a frequency coinciding with a resonance frequency or anti-resonance frequency of the machine, or a frequency approximate to such a frequency, there may be a case where the commanded vibration is accompanied with generation of a mechanical resonance, an overshoot in which the amplitude of feedback becomes larger than the command, or a vibration attenuation in which the amplitude of feedback becomes smaller than the command. Accordingly, it is necessary to perform selection for the vibration frequency, while avoiding a frequency falling in the mechanical resonance frequency band and the machine anti-resonance frequency band. According to the first embodiment, the storage unit 43 stores a vibration frequency band to be avoided, as the invalid frequency region 4311. FIG. 10 is a view illustrating a concrete example of the invalid frequency region 4311 serving as an invalid frequency region commonly owned in the system.

For example, such a case is assumed that the machining program 432 commands the main shaft rotational speed=3,000 (r/min), under the number of vibrations per rotation=1.5 (times/r). At this time, if the invalid frequency region 4311 has been set as a parameter for setting an invalid frequency region commonly owned in the system as illustrated in FIG. 10, the conditions of each of Nos. 11 to 13 provided with hatching as illustrated in FIG. 11 cannot be selected, unlike the example illustrated in FIG. 5 in which the process period is 1.0 (ms).

Specifically, since the conditions of No. 12 selectable in the case of the basic form end up being included in the invalid frequency region 4311, the vibration condition determining unit 484 cannot select these conditions. Based on a value of the main shaft rotational speed commanded by the machining program 432 and the invalid frequency region 4311, the vibration condition determining unit 484 selects a frequency of 66.7 (Hz) in the conditions of No. 14, which include the main shaft rotational speed=2,666 (r/min) that is closest to the commanded value of the main shaft rotational speed=3,000 (r/min), among those outside the invalid frequency region 4311. Here, since there may be a case where a plurality resonance frequencies or anti-resonance frequencies are present for one drive axis, a plurality of frequency bands may be stored as the invalid frequency region 4311. As described above, the numerical control device 2 can set a frequency optimum to low frequency vibration cutting, while avoiding a resonance frequency or anti-resonance frequency of the machine.

Second Embodiment

Figure 12:
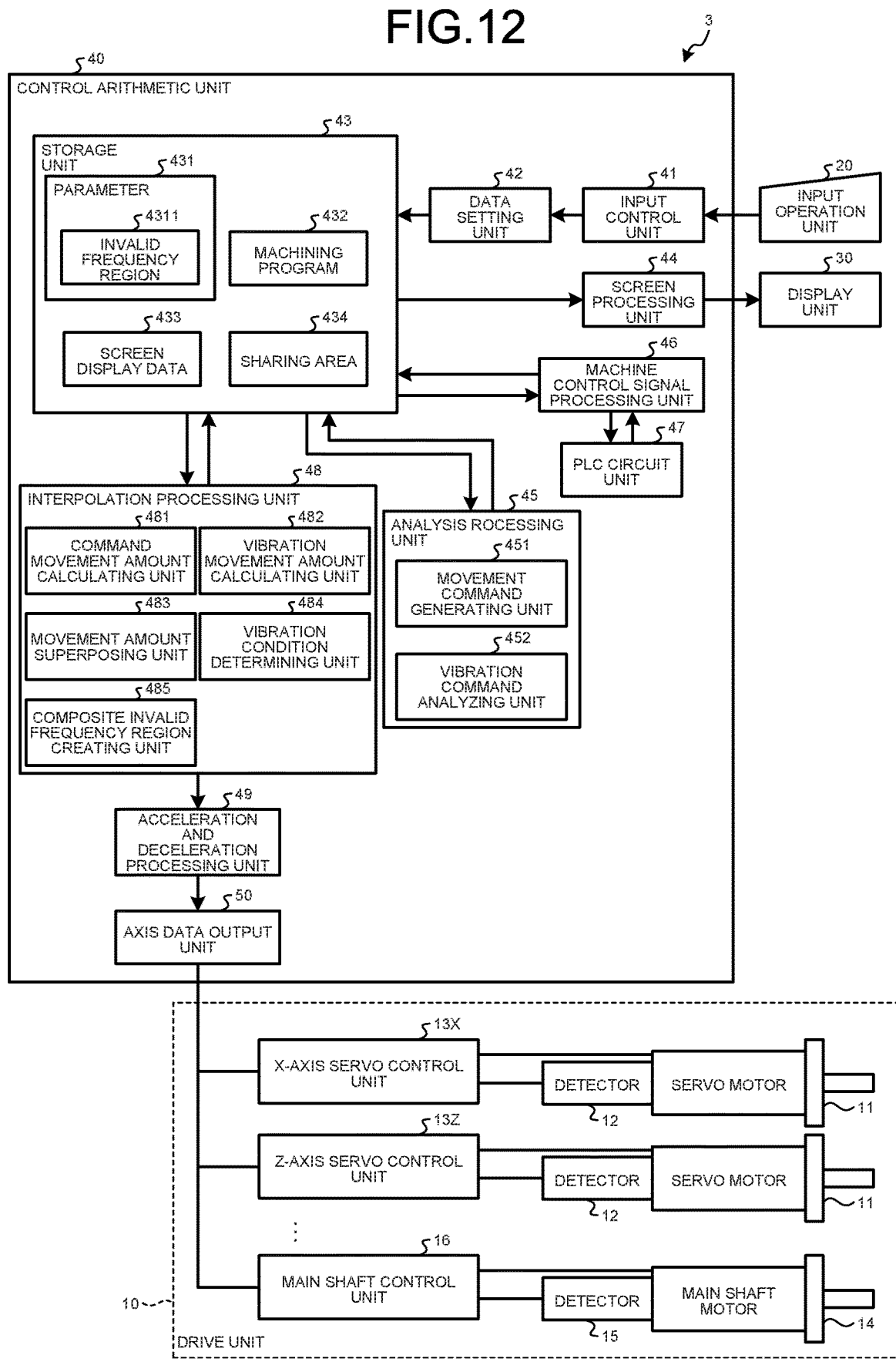
FIG. 12 is a block diagram illustrating a configuration example of a numerical control device according to a second embodiment.

FIG. 12 is a block diagram illustrating a configuration example of a numerical control device 3 according to a second embodiment. In the numerical control device 3, the interpolation processing unit 48 further includes a composite invalid frequency region creating unit 485 for combining invalid frequency regions for respective drive axes. Other than the above, the components of the block denoted by the same reference symbols as those of FIG. 9 according to the first embodiment have the same functions as those described above, and so their description will be omitted.

As in the first embodiment, the storage unit 43 of the numerical control device 3 also includes the invalid frequency region 4311 indicating a region of a frequency that cannot be set as the vibration frequency. However, in general, the resonance frequency and the anti-resonance frequency with respect to a frequency commanded as the vibration frequency for low frequency vibration cutting differ at every drive axis. Accordingly, the invalid frequency region 4311 holds invalid frequency regions for respective drive axes. Here, the composite invalid frequency region creating unit 485 combines the invalid frequency regions for all of the drive axes for low frequency vibration cutting.

Figure 14:
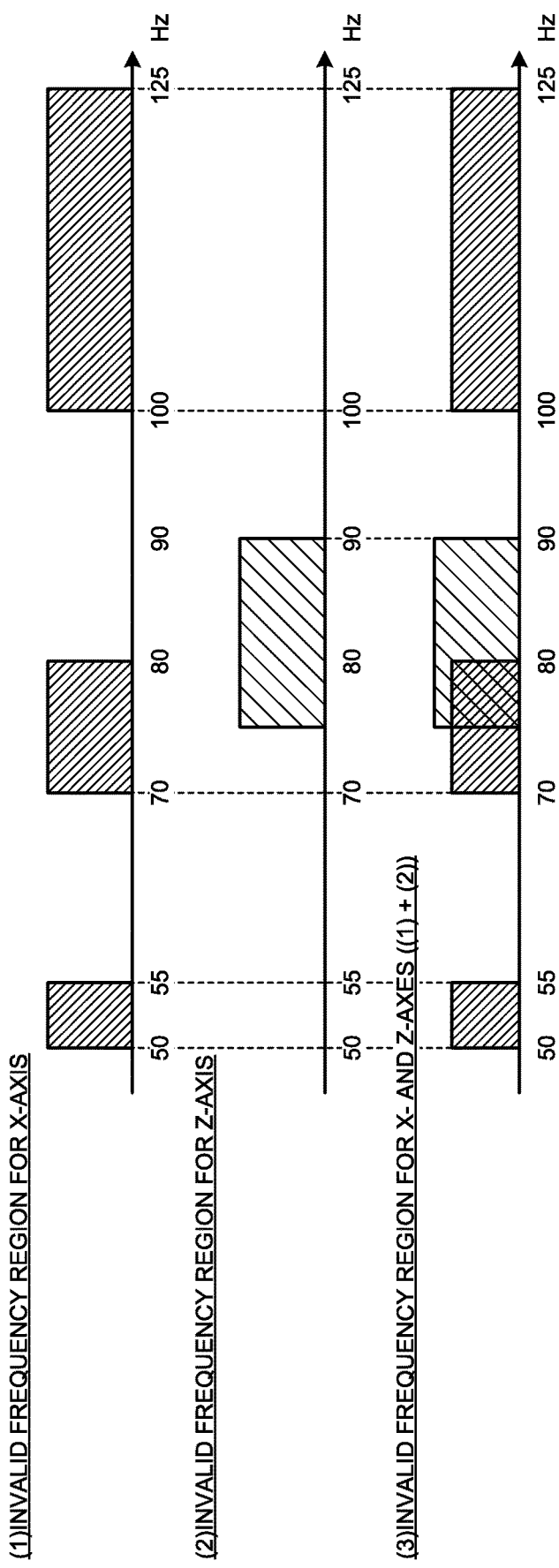
FIG. 14 is a view illustrating the invalid frequency regions for the respective axes by arraying them, according to the second embodiment.

For example, where the drive axes used for low frequency vibration cutting are the X-axis and the Z-axis, and the interpolation processing unit 48 performs interpolation in the X-axis direction and the Z-axis direction, the parameter 431 of the storage unit 43 includes the invalid frequency region 4311. The invalid frequency region is a region of a frequency that cannot be set as the vibration frequency. The invalid frequency region 4311 illustrated in FIG. 13 includes invalid frequency regions for each of the X-axis and the Z-axis. FIG. 14 is a view illustrating the invalid frequency region 4311 of FIG. 13 by arraying (1) an invalid frequency region for the X-axis, (2) an invalid frequency region for the Z-axis, and (3) an invalid frequency region for the X-axis and the Z-axis combined, where the horizontal axis indicates the frequency.

Based on the invalid frequency region 4311 including those for respective ones of the X-axis and the Z-axis, the composite invalid frequency region creating unit 485 creates a composite invalid frequency region that combines the invalid frequency region for the X-axis with the invalid frequency region for the Z-axis, as illustrated in (3) of FIG. 14.

Where the composite invalid frequency region has been set as illustrated in (3) of FIG. 14, the conditions of each of Nos. 7 to 9, 11 to 13, 18, and 19 provided with hatching as illustrated in FIG. 15 cannot be selected, unlike the example illustrated in FIG. 5. For example, under the number of vibrations per rotation=1.5 (times/r), when the machining program 432 commands the main shaft rotational speed=3,000 (r/min), the conditions of each of Nos. 11 to 13 cannot be selected.

Based on a value of the main shaft rotational speed commanded by the machining program 432 and the composite invalid frequency region, the vibration condition determining unit 484 selects a frequency of 66.7 (Hz) in the conditions of No. 14, which include the main shaft rotational speed=2,666 (r/min) that is closest to the commanded value of the main shaft rotational speed=3,000 (r/min), among those outside the composite invalid frequency region. Here, a plurality of frequency bands may be stored as the composite invalid frequency region.

Where the process period is sufficiently small, there is no need to consider the circumstance that the necessary process periodic number per vibration can take only a value of an integral multiple of two times or more of the process period as illustrated in FIG. 15. Accordingly, where the process period is sufficiently small, and conditions of the main shaft rotational speed=3,000 (r/min) and the number of vibrations per rotation=1.5 (times/r) are given, the following calculation is made.

$$3{,}000 \text{ (r/min)} \times 1.5 \text{ (times/r)}/60 \text{ (s)} = 75 \text{ (Hz)}$$

However, in order to select a frequency as approximate as possible while avoiding the composite invalid frequency region, if there is a condition where the main shaft rotational speed is changed in units of 1 (r/min), the main shaft rotational speed=2,799 (r/min) is used, and 69.98 (Hz) is selected by the vibration condition determining unit 484.

Further, FIG. 16 is a view illustrating conditions with a frequency included in the composite invalid frequency region, by giving hatching to such conditions of FIG. 8, which illustrates vibration conditions in a situation where three values of 0.5, 1.5, and 2.5 are acceptable as the number of vibrations per rotation (times/r), by sorting them in the order of values of the main shaft rotational speed, under the main shaft rotational speed=4,000 (r/min) or less. In the situation where three values of 0.5, 1.5, and 2.5 are acceptable as the number of vibrations per rotation (times/r), the vibration condition determining unit 484 determines, as the frequency for vibration cutting, a frequency in the conditions with a value of the main shaft rotational speed as approximate as possible to a value of the main shaft rotational speed commanded by the machining program 432, while avoiding the composite invalid frequency region. For example, where the main shaft rotational speed=3,000 (r/min) is commanded, since the conditions of No. 18 fall in the composite invalid frequency region, the frequency in the conditions of No. 17 comes to be selected. As described above, the numerical control device 3 can set an optimum frequency, while avoiding all of the resonance frequencies or anti-resonance frequencies for the respective drive axes serving as feeding axes in low frequency vibration cutting machining.

Third Embodiment

Figure 17:
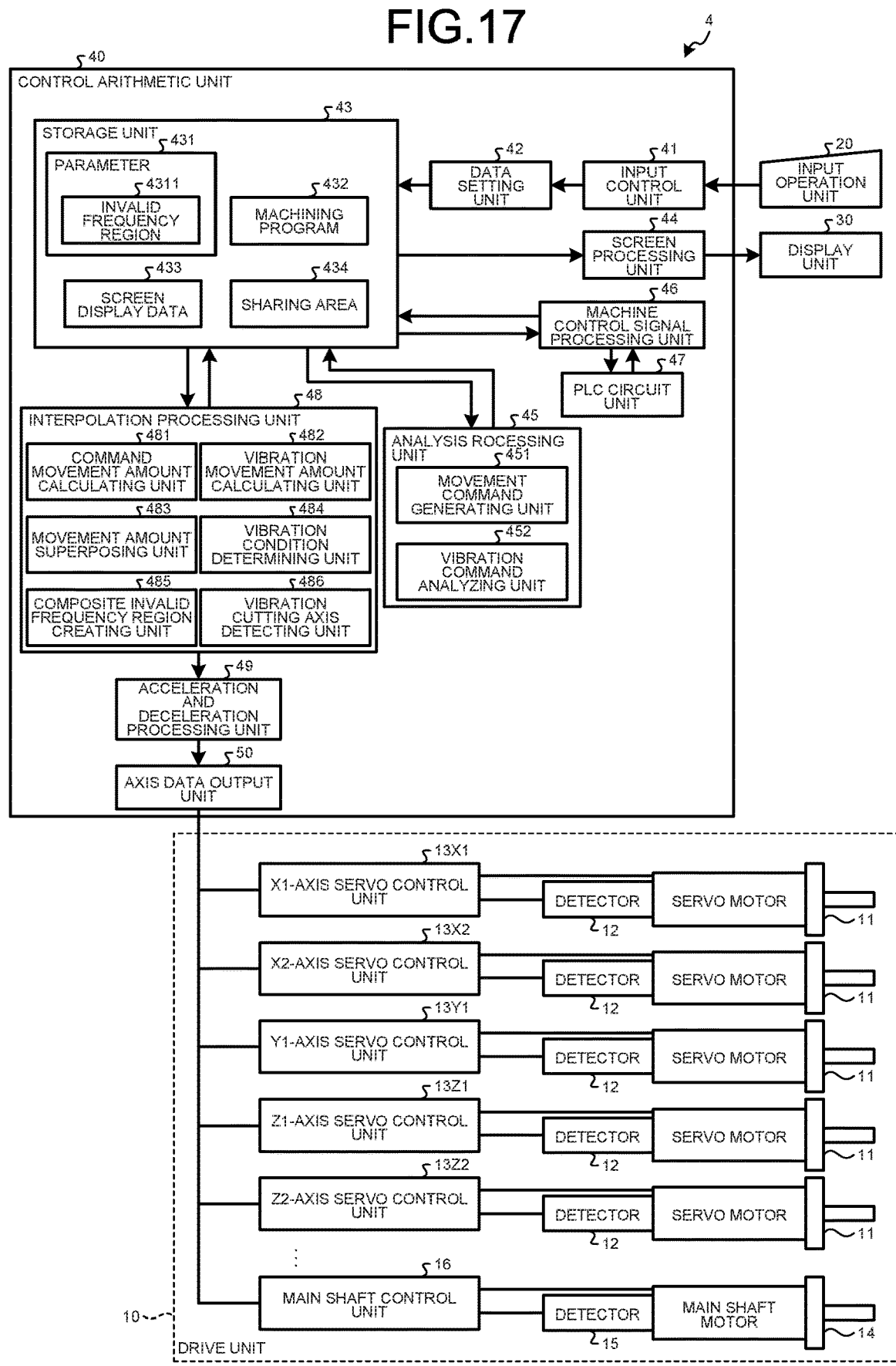
FIG. 17 is a block diagram illustrating a configuration example of a numerical control device according to a third embodiment.

FIG. 17 is a block diagram illustrating a configuration example of a numerical control device 4 according to a third embodiment. In the numerical control device 4, the interpolation processing unit 48 further includes a vibration cutting axis detecting unit 486 for detecting drive axes used as feeding axes for vibration cutting. Further, the drive unit 10 includes: servo motors 11 for moving the machining object or tool in respective axis directions defined on the numerical control device 4; detectors 12 for detecting the position and speed of the respective servo motors 11; and an X1-axis servo control unit 13X1, an X2-axis servo control unit 13X2, a Y1-axis servo control unit 13Y1, a Z1-axis servo control unit 13Z1, and a Z2-axis servo control unit 13Z2, which are for controlling the position and speed of the machining object or tool in the respective axis directions, based on the position and speed detected by the detectors 12. Other than the above, the components of the block denoted by the same reference symbols as those of FIG. 12 according to the second embodiment have the same functions as those described above, and so their description will be omitted.

In cutting machining, machining programs are respectively present for systems each of which treats a plurality of drive axes as one control object, and the operations of the respective systems can be performed in parallel with each other. For example, there is assumed a configuration of two systems with five axes, in which the drive axes belonging to a system 1 are an X1-axis, a Z1-axis, and a Y1-axis, and the drive axes belonging to a system 2 are an X2-axis and a Z2-axis. Further, it is assumed that the drive axes usable for vibration cutting are the X1-axis, the Z1-axis, the X2-axis, and the Z2-axis.

At the time point when vibration cutting machining is started by use of the system 1, even if a movement command has been given for only one of the X1-axis and the Z1-axis, the vibration cutting axis detecting unit 486 detects both of the X1-axis and the Z1-axis, which are usable for vibration cutting, of the drive axes belonging to the system 1. The drive axes usable for vibration cutting are set in the parameter 431, for example. The invalid frequency region 4311 holds invalid frequency regions for respective drive axes, in the same manner as the second embodiment, and the composite invalid frequency region creating unit 485 combines the invalid frequency regions of all of the detected drive axes. The vibration condition determining unit 484 selects a frequency outside the composite invalid frequency region.

In a case where movement axes are switched between vibration cutting feeding command blocks continuous with each other, if the vibration conditions need to be switched between the blocks, the machining time ends up being prolonged because a waiting time is generated for, e.g., vibration convergence due to waiting for a deceleration check, and a changeover of the main shaft revolution number. In order to prevent this problem from occurring, even if a movement command has been given for only one of the X1-axis and the Z1-axis, the composite invalid frequency region creating unit 485 combines the invalid frequency regions. Consequently, even where the vibration cutting machining uses the X1-axis at first and then comes to use the Z1-axis halfway through it, there is no need to perform an operation for switching frequencies to avoid invalid frequency regions.

The matter described above is also true in a case where: machining is first performed under a state using a configuration of two systems with five axes, in which the drive axes belonging to a system 1 are the X1-axis, the Z1-axis, and the Y1-axis, and the drive axes belonging to a system 2 are the X2-axis and the Z2-axis; and then the axis configurations of the respective systems are altered by an exchange of axes between the Z1-axis and Z2-axis, such that the drive axes belonging to the system 1 are the X1-axis, the Z2-axis, and the Y1-axis, and the drive axes belonging to the system 2 are the X2-axis and the Z1-axis. As in the case described above, at the time point when vibration cutting machining is started by use of the system 1 after the exchange of axes, even if a movement command has been given for only one of the X1-axis and the Z2-axis, the vibration cutting axis detecting unit 486 detects both of the X1-axis and the Z2-axis, which are usable for vibration cutting, of the drive axes belonging to the system 1. Further, the composite invalid frequency region creating unit 485 combines the invalid frequency regions of all of the detected drive axes. The composite invalid frequency region creating unit 485 creates a composite invalid frequency region for the drive axes usable for vibration cutting in the system 1 after the exchange of axes. Thereafter, the vibration condition determining unit 484 selects a frequency outside the composite invalid frequency region. In the third embodiment, the system 1 is taken as an example for the explanation, but the system 2 can be treated by the same way of selecting a frequency as in the system 1. As described above, the numerical control device 4 can set an optimum frequency, while avoiding all of the resonance frequencies or anti-resonance frequencies for respective drive axes, even if there is an exchange of drive axes serving as feeding axes in low frequency vibration cutting machining.

The configurations illustrated in the above embodiments are mere examples of the contents of the present invention, and they may be combined with other known techniques. Further, the configurations may be partly omitted or changed without departing from the spirit of the present invention.

REFERENCE SIGNS LIST

1, 2, 3, 4 numerical control device, 10 drive unit, 11 servo motor, 12, 15 detector, 13X1 X1-axis servo control unit, 13X2 X2-axis servo control unit, 13Y1 Y1-axis servo control unit, 13Z1 Z1-axis servo control unit, 13Z2 Z2-axis servo control unit, 14 main shaft motor, 16 main shaft control unit, 20 input operation unit, 30 display unit, 40 control arithmetic unit, 41 input control unit, 42 data setting unit, 43 storage unit, 44 screen processing unit, 45 analysis processing unit, 46 machine control signal processing unit, 47 PLC circuit unit, 48 interpolation processing unit, 49 acceleration and deceleration processing unit, 50 axis data output unit, 61 machining object, 62 tool, 431 parameter, 432 machining program, 433 screen display data, 434 sharing area, 451 movement command generating unit, 452 vibration command analyzing unit, 481 command movement amount calculating unit, 482 vibration movement amount calculating unit, 483 movement amount superposing unit, 484 vibration condition determining unit, 485 composite invalid frequency region creating unit, 486 vibration cutting axis detecting unit, 4311 invalid frequency region.

The invention claimed is:

1. A numerical control device that controls a drive unit including drive axes for machining a machining object by moving a tool and the machining object relative to each other along a movement path while applying vibration, by use of the drive axes provided for the tool or the machining object,
wherein a rotational speed of a main shaft that rotates the machining object when performing the machining and a number of vibrations of the vibration to be applied during each one rotation of the main shaft are determined based on a predetermined frequency selected from a plurality of preset frequencies of the vibration to be applied,
the numerical control device comprising:
a memory to store data that identifies at least one specific frequency of the vibration to be avoided due to one or more resonance frequencies or anti-resonance frequencies of one of the rotation axes from among the plurality of preset frequencies of the vibration to be applied; and
a controller configured to change: i) a rotational speed of a main shaft or ii) a number of vibrations, wherein the change is based on: a) a commanded rotational speed of the main shaft for rotating the machining object, b) a given number of applied vibrations of the vibration in each one rotation of the main shaft, and c) a process period for forming a movement command to the drive axes, whereby a frequency of the vibration to be applied becomes a frequency that is different from the specific frequency stored in the memory.

2. The numerical control device according to claim 1, wherein the vibration condition determiner determines a frequency of the vibration to be applied, under a condition where one period of the vibration to be applied is an integral multiple of the process period.

3. A numerical control device that controls a drive unit including drive axes for machining a machining object by moving a tool and the machining object relative to each other along a movement path while applying vibration, by use of the drive axes provided for the tool or the machining object,
wherein a rotational speed of a main shaft that rotates the machining object when performing the machining and a number of vibrations of the vibration to be applied during each one rotation of the main shaft are determined based on a predetermined frequency selected from a plurality of preset frequencies of the vibration to be applied, the numerical control device comprising:
- a memory to store data that identifies a plurality of specific frequencies of the vibration for the respective drive axes which are related to the vibration to be applied, which are to be avoided due to one or more resonance frequencies or anti-resonance frequencies of the rotation axes, from among a plurality of preset frequencies of the vibration to be applied; and
- a controller configured to, based on the plurality of frequency data, change: i) the rotational speed of the main shaft or ii) the number of applied vibrations, wherein the change is based on: a) a commanded rotational speed of the main shaft for rotating the machining object, b) a given number of applied vibrations of the applied vibration in each one rotation of the main shaft, and c) a process period for forming a movement command to the drive axes, so that a frequency of the vibration to be applied becomes a frequency that is different from the specific frequencies stored in the memory.

4. The numerical control device according to claim 3, further comprising a vibration cutting axis detector to detect drive axes usable as feeding axes for generating the applied vibration,
wherein the plurality of specific frequencies is based on the drive axes detected by the vibration cutting axis detector.

5. The numerical control device according to claim 3, wherein the vibration condition determiner determines a frequency of the vibration to be applied, under a condition where one period of the vibration to be applied is an integral multiple of the process period.

* * * * *